(12) United States Patent
Bayona P. et al.

(10) Patent No.: US 10,022,941 B2
(45) Date of Patent: Jul. 17, 2018

(54) MULTILAYER MATTE BIAXIALLY ORIENTED POLYPROPYLENE FILM WITH ULTRA LOW SEAL INITIATION TEMPERATURE

(71) Applicant: INTEPLAST GROUP, LTD., Livingston, NJ (US)

(72) Inventors: Rafael E. Bayona P., Morristown, TN (US); Gregory G. Gillis, Knoxville, TN (US)

(73) Assignee: Inteplast Group Corporation, Livingston, NJ (US)

( * ) Notice: Subject to any disclaimer, the term of this patent is extended or adjusted under 35 U.S.C. 154(b) by 41 days.

(21) Appl. No.: 14/485,384

(22) Filed: Sep. 12, 2014

(65) Prior Publication Data

US 2015/0072127 A1 Mar. 12, 2015

Related U.S. Application Data

(60) Provisional application No. 61/877,021, filed on Sep. 12, 2013.

(51) Int. Cl.
*B32B 27/08* (2006.01)
*B32B 27/32* (2006.01)
*B32B 27/20* (2006.01)

(52) U.S. Cl.
CPC .............. *B32B 27/08* (2013.01); *B32B 27/20* (2013.01); *B32B 27/32* (2013.01); *B32B 2250/242* (2013.01); *B32B 2264/102* (2013.01); *B32B 2307/31* (2013.01); *B32B 2307/518* (2013.01); *B32B 2307/54* (2013.01); *B32B 2323/10* (2013.01); *B32B 2439/00* (2013.01); *B32B 2439/70* (2013.01); *Y10T 428/24975* (2015.01); *Y10T 428/2826* (2015.01)

(58) Field of Classification Search
CPC ..... B32B 27/32; B32B 27/08; B32B 2439/70; B32B 2250/24; C08L 23/10; C08L 23/14; C08L 23/142; C08L 23/12; C08L 23/16; C08L 23/18; C08L 23/20; Y10T 428/2826; Y10T 428/2495; Y10T 428/2848; Y10T 428/24975
USPC .............. 428/35.7, 36.9, 36.91; 230/500
See application file for complete search history.

(56) References Cited

U.S. PATENT DOCUMENTS

| | | |
|---|---|---|
| 4,996,096 A | 2/1991 | Dew |
| 5,258,422 A * | 11/1993 | Chang .................. C08K 5/0033 523/124 |
| 5,489,454 A | 2/1996 | Peiffer et al. |
| 8,431,234 B2 | 4/2013 | Koehn et al. |

(Continued)

OTHER PUBLICATIONS

Tripathi, Devesh. Practical Guide to Polypropylene, Dec. 2002, Smithers Rapra Technology, pp. 9-10 and 92.*

(Continued)

*Primary Examiner* — Maria V Ewald
*Assistant Examiner* — Ethan Weydemeyer
(74) *Attorney, Agent, or Firm* — Senniger Powers LLP

(57) ABSTRACT

A heat-sealable polymer-based multilayer film having a low sealing initiation temperature, good haze, and low gloss for packaging applications. The film comprises a seal interlayer formed from a blend having a propylene-butene copolymer and a skin layer applied over the seal interlayer, with the seal interlayer being between the skin layer and the core layer.

17 Claims, 1 Drawing Sheet

← A-2 Skin/surface layer
← A-1 Seal interlayer

← B Core layer

← C

(56) References Cited

U.S. PATENT DOCUMENTS

| | | | |
|---|---|---|---|
| 2002/0019507 A1* | 2/2002 | Karandinos | C09J 123/10 526/348.2 |
| 2003/0021981 A1* | 1/2003 | Lu et al. | 428/317.9 |
| 2003/0165703 A1* | 9/2003 | Pelliconi | C08J 5/18 428/516 |
| 2003/0211350 A1* | 11/2003 | Migliorini | B32B 27/08 428/515 |
| 2004/0023052 A1* | 2/2004 | Ambroise | 428/515 |
| 2004/0198919 A1* | 10/2004 | Pelliconi | C08F 210/06 525/333.7 |
| 2008/0220226 A1* | 9/2008 | Koehn | B29C 47/0019 428/200 |
| 2010/0055429 A1* | 3/2010 | Lee et al. | 428/213 |
| 2011/0083796 A1* | 4/2011 | Sheppard | B32B 27/32 156/213 |
| 2012/0258307 A1 | 10/2012 | Cretekos et al. | |

OTHER PUBLICATIONS

Technical Data, MTS, Biaxially Oriented Polypropylene Film, Matte, One Side Sealable, One Side Treated, Slip Modified, Generated: Jul. 2, 2013, 1 page.

Technical Data, MCP, Biaxially Oriented Polypropylene Film, Matte, One Side Sealable, One Side Treated, High COF, Generated: Jul. 2, 2013, 1 page.

Technical Data, MCS, Biaxially Oriented Polypropylene Film, Matte, One Side Sealable, One Side Treated, Slip Modified, Generated: Jul. 2, 2013, 1 page.

\* cited by examiner

MULTILAYER MATTE BIAXIALLY ORIENTED POLYPROPYLENE FILM WITH ULTRA LOW SEAL INITIATION TEMPERATURE

FIELD OF THE INVENTION

The present invention generally relates to heat-sealable biaxially oriented polypropylene (BOPP) films for various applications such as packaging.

BACKGROUND OF THE INVENTION

Heat-sealable films are widely used in packaging applications for consumer items such as snacks, bakery overwrapping, confectionery, etc. Heat-sealable films can be oriented polymeric films, such as BOPP films. In certain applications it is desirable to have a relatively low sealing initiation temperature (SIT), so that low temperature is necessary to initiate the sealing operation, permitting the packer to run at faster speeds or improving the seal integrity of the final pack. Heat-sealable BOPP plastic films are known from, for example, U.S. Pat. No. 8,431,234; U.S. Pat. No. 5,489,454; U.S. Pat. No. 4,996,096; and US Pub. 2012/0258307.

U.S. Pat. No. 8,431,234 discloses a BOPP film comprising a polyolefin base layer, and a heat-sealable matte resin layer consisting of 15 to 30 wt % of a metallocene-catalyzed propylene-butene copolymer (PBC) elastomer having a 20-40 wt % butene content. The film has at least a 60% haze measured in accordance with ASTM D1003. It is not possible to further lower the sealing initiation temperature (SIT) of this film because further increasing the PBC content to lower the SIT worsens the matte appearance (gloss increases and haze decreases). There are also issues with production continuity.

SUMMARY OF THE INVENTION

Briefly, therefore, the invention is directed to a heat-sealable polymer-based multilayer film comprising a polymer-based core layer, a seal interlayer applied to a first side of the core layer, where the seal interlayer comprises a seal-layer propylene-butene copolymer, and a skin layer applied over the seal interlayer with the seal interlayer being between the skin layer and the core layer, wherein the skin layer comprises a skin layer propylene-butene copolymer, and one or more polymer-based layers applied to a second side of the core layer opposite the first side.

In another aspect, the invention is directed to a heat-sealable polymer-based multilayer film comprising a polymer-based core layer, a seal interlayer applied to a first side of the core layer, where the seal interlayer comprises a seal-layer propylene-butene copolymer, a skin layer applied over the seal interlayer with the seal interlayer being between the skin layer and the core layer, wherein the skin layer comprises no more than 12 wt % of a propylene-butene copolymer, and one or more polymer-based layers applied to a second side of the core layer opposite the first side.

The invention is also directed to a heat-sealable polymer-based multilayer film comprising a polymer-based core layer, a seal interlayer applied to a first side of the core layer, where the seal interlayer comprises a seal-layer propylene-butene copolymer, a skin layer applied over the seal interlayer with the seal interlayer being between the skin layer and the core layer, wherein the skin layer is devoid of the propylene-butene copolymer contained in the seal interlayer, and one or more polymer-based layers applied to a second side of the core layer opposite the first side.

The invention is further directed to a heat-sealable polymer-based multilayer film comprising a polymer-based core layer; a seal interlayer applied to a first side of the core layer, wherein the seal interlayer is formed from a blend comprising a seal-layer propylene-butene copolymer; a skin layer applied over the seal interlayer with the seal interlayer being between the skin layer and the core layer, wherein the skin layer is formed from a blend comprising a skin layer propylene-butene copolymer; and one or more polymer-based layers applied to a second side of the core layer opposite the first side.

The invention in a further aspect encompasses a heat-sealable polymer-based multilayer film comprising a polymer-based core layer; a seal interlayer applied to a first side of the core layer, where the seal interlayer is formed from a blend comprising a seal-layer propylene-butene copolymer; a skin layer applied over the seal interlayer with the seal interlayer being between the skin layer and the core layer, wherein the skin layer is formed from a blend comprising no more than 12 wt % of a propylene-butene copolymer; and one or more polymer-based layers applied to a second side of the core layer opposite the first side.

The invention is also directed to a heat-sealable polymer-based multilayer film comprising a polymer-based core layer; a seal interlayer applied to a first side of the core layer, where the seal interlayer comprises a seal-layer propylene-butene copolymer; a skin layer applied over the seal interlayer with the seal interlayer being between the skin layer and the core layer, wherein the skin layer is devoid of the propylene-butene copolymer contained in the seal interlayer; and one or more polymer-based layers applied to a second side of the core layer opposite the first side.

In another aspect, the invention is a heat-sealable polymer-based multilayer film comprising a seal interlayer which contains a first seal-layer propylene-butene copolymer and a second seal-layer propylene-butene copolymer, wherein the first copolymer has a higher butene concentration and a lower melting temperature than the second copolymer.

The invention is also directed to a heat-sealable polymer-based multilayer film comprising a seal interlayer formed from a blend of components comprising a first seal-layer propylene-butene copolymer and a second seal-layer propylene-butene copolymer, wherein the first copolymer has a higher butene concentration and a lower melting temperature than the second copolymer.

The invention is also directed to a method for forming the foregoing multilayer films.

Other objects and features will be in part apparent and in part pointed out hereinafter.

DESCRIPTION OF THE EMBODIMENT(S) OF THE INVENTION

Figure 1:
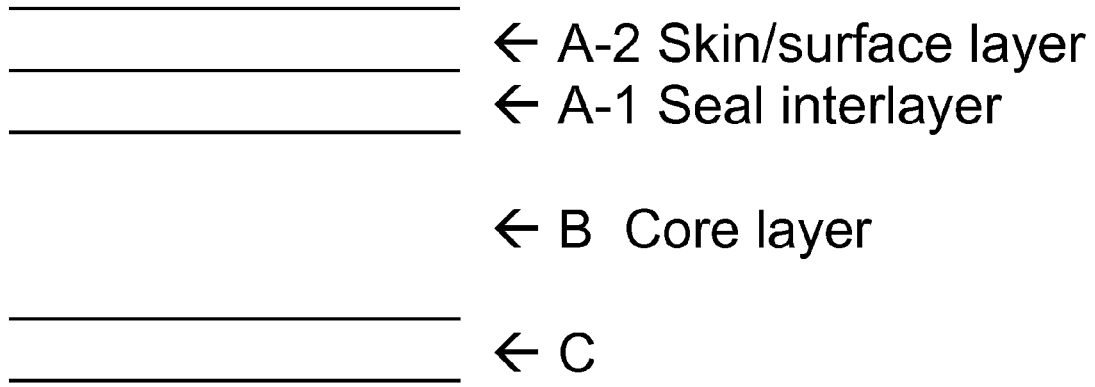
FIG. 1 is a schematic illustration of a first embodiment of the film of the invention.
Figure 2:
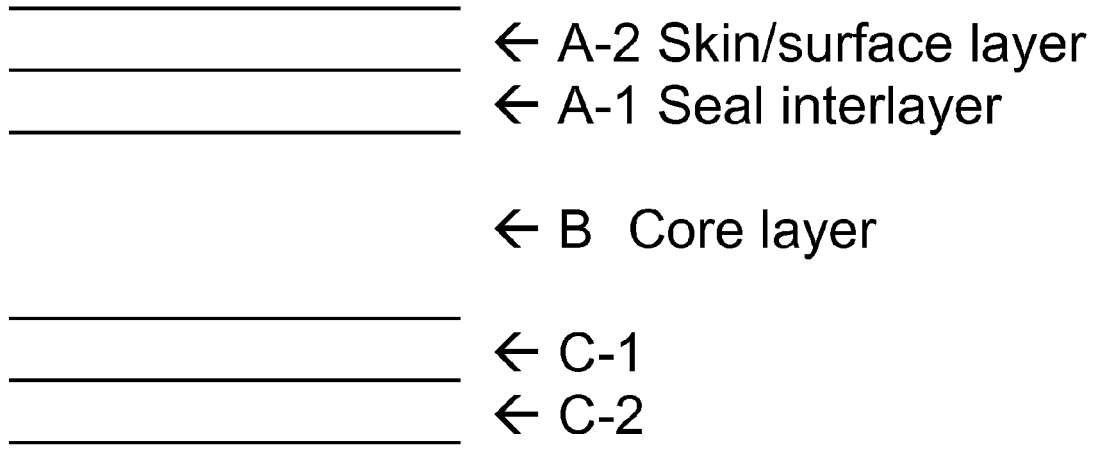
FIG. 2 is a schematic illustration of a second embodiment of the film of the invention.

The present invention is directed to heat-sealable BOPP film which has at least four layers, such as four or five layers as shown in FIGS. 1 and 2, and optionally more layers.

There is a core layer designated B herein, and its primary function is to provide the film its high mechanical properties like stiffness, tensile strength and tensile modulus, provide some barrier to water vapor transmission and be the major layer in proportion to support the other layers.

Next to the core layer there is a seal interlayer designated A-1 herein, and its primary function is to impart a relatively lower SIT and high sealing strength as well as help with the matte appearance of the film. The A-1 interlayer provides the primary sealing properties to the film, permitting high output during the packaging process.

Next to the A-1 seal interlayer and opposite to the core layer side there is a skin or surface layer designated A-2 herein and its primary function is to impart the desired exterior matte finish to the film and start the sealing process due to its very low SIT. Its secondary functions include antiblocking and cooperating with other layers to facilitate a low sealing initiation temperature (SIT). This skin layer contains some PBC content and therefore assists with the sealing function; though the primary sealing function is accomplished by the A-1 seal interlayer. The layer A-2 film will be on the outside of the packaging away from the packed goods. This layer A-2 has a primary function to provide a desired matte appearance. The sealing interlayer A-1 is situated next to the core layer B, with the interlayer A-1 and the core layer B preferably in intimate contact with each with no other layers between them. The skin layer A-2 is directly on the seal interlayer A-1.

A fourth layer is an outer layer designated C (or C-1 and C-2 in five layers structures) herein, and its primary function is a receptive layer to receive electrical discharges, known as corona treatment or direct heat by gas combustion, known as flame treatment, to increase the surface energy, ensuring a proper wet out and bond of inks and adhesives. It is an "outer" layer in the sense that this layer is on the opposite side of the core layer from the skin layer A-2 and sealing interlayer A-1. It is a "printable" layer in that its function is to receive adhesives by printing for lamination to another layer. Typically this is laminated to another either clear or metallized BOPP film by either adhesion or polyextrusion. It is on the opposite side of the core from the skin layer A-2 and seal interlayer A-1. Instead of a single layer C as in the embodiment shown in FIG. 1, a preferred embodiment has a fourth layer C-1 (an inter-layer) and a fifth printable or outer layer C-2, as shown in FIG. 2. In packaging applications when the film is applied to products, layer C or C-2 is adjacent or in contact or closer to the product being packaged or wrapped or in contact with another film that has been laminated to another either clear or metallized BOPP film by either adhesion or polyextrusion. And layers A-1 and A-2 are the outermost layer away from the product. The outer layer C is preferably in intimate contact with and directly on the core layer B with no other layers between them. In embodiments with two layers C-1 and C-2, it is preferred that the interlayer C-1 is directly in contact with the core layer and the outer or printable layer C-2 is directly on the other side of the layer C-1. The outermost layer on this side of the core may also be designated an antiblock layer to refer to another major function of this layer.

The specific composition and other features of the particular layers will now be described. In describing the non-limiting exemplary embodiments, there is reference herein to three types of the C3/C4 (propylene/butene) copolymers which have been used and they are referred to as PBC-1, PBC-2 and PBC-3. These differ from each other in terms of C4 content and Tm° (Tm=melting point); and all have a similar melt flow index. The compositions of the layers are described as containing various components by weight %. However, those skilled in the art understand that in a layer of the ultimate film, the specific compounds such as the polypropylene and propylene-butene copolymer may not be separately identifiable or even necessarily separately present. Nonetheless, it is conventional in the art to refer to the final composition as containing a given % of the individual components that go into forming the film; so that is done here. From this perspective, the compositions herein are on an equivalent basis. All percentages herein are by weight unless indicated otherwise.

The core layer B of the film of the invention is a polymer-based layer which comprises at least about 50 wt % polymer, such as at least about 90 wt % and up to 100 wt % of a polymer. In one embodiment, core layer B has from about 90 to about 100 wt % of a homopolymer of polypropylene. In one such embodiment this homopolymer is homopolymer polypropylene having a melt flow index (MFI) between 1.2 to 3.0 g/10 minutes preferable 1.6 to 2.4 g/10 min. An antistatic agent such as an amine may be optionally included. For example, there may be between about 50 and about 500 ppm of an amine as an antistatic agent, such as about 150 ppm. A slip agent may also be included. A slip additive is a plastics modifier that acts as a lubricant by exuding to the surface of the plastic during and immediately after processing to reduce friction between layers of film. Lower friction facilitates handling of the film and other surfaces, e.g., rollers, to which the film comes into contact. Slip additives are generally fatty materials, such as, for example, long chain fatty acids, alcohols, and amides. Preferred slip additives are fatty amides having carbon chains generally ranging from 14 to 22 carbon atoms, such as from 15 to 19 carbon atoms, including oleamide and stearic amide. For example, core layer B may include between about 150 and 500 ppm of an amide as a slip agent, such as about 250 ppm. Accordingly, in one embodiment the core layer B comprises more than 90 wt % homopolymer PP, between about 50 and 500 ppm of an antistatic agent, and between about 150 and 500 ppm of a slip agent. In one such embodiment, the 99+ wt % balance of the core layer B is homopolymer PP other than the antistatic and slip agent.

The layer in the film designated seal interlayer A-1 herein in one preferred embodiment contains two distinct propylene-butene copolymers designated herein as PBC-2 and PBC-3. The seal interlayer A-1 also comprises a matte resin which is, for example, a blend of polypropylene (PP) and polyethylene (PE). A preferred proportion of PP to PE in the blended matte resin is between about 40 and about 60 wt % PP and between about 40 and about 60 wt % PE. The polypropylene is, for example, a PP homopolymer or an ethylene-propylene copolymer or a propylene-ethylene-butene terpolymer. The polyethylene is, for example, a high density polyethylene (HDPE), a medium density polyethylene (MDPE), or a low density polyethylene (LDPE). In one embodiment, the A-1 seal interlayer contains from about 20 to about 30 wt % PBC-3 and from about 40 to about 60 wt % PBC-2. Component PBC-2 contains between about 16 to about 28% wt % butene, such as from about 18 to about 26% wt % butene, and has a melting point of about 83° C. Component PBC-3 has a lower butene content and a higher melting point of about 135° C. Seal interlayer A-1 may also optionally comprise from about 1000 to about 3000 ppm of one of the aforementioned antiblock agents. One embodiment of the seal interlayer A-1 comprises from about 20 to about 30 wt % PBC-3, from about 40 to about 60 wt % PBC-2, and from about 17 to 25 wt % of a pre-blended matte resin. Another embodiment of the seal interlayer A-1 comprises from about 20 to about 30 wt % PBC-3, from about 40 to about 60 wt % PBC-2, from about 17 to 25 wt % of a pre-blended matte resin, from about 0.1 to 0.5 wt % of a fluoroelastomer, and from about 1000 to about 3000 ppm of one of the aforementioned antiblock agents. This antiblock additive preferably has a particle size between about 2 and about 5 μm. Butene-containing components PBC-2 and PBC-3 differ from each other in their respective butene content. In one preferred embodiment, this seal interlayer is formed from a blend of at least three components, one of which is a first butene-containing component having a first melting temperature and the other of which is a second butene-containing component having a second melting temperature which is at least about 10% higher than the melting temperature of the first butene-containing component. The butene content of the first butene-containing component is greater than the butene content of the second butene-containing component, such as at least 10% greater, at least 20% greater, or at least 30% greater, such as between 10 and 50% greater, between 20 and 40% greater, or between 30 and 40% greater. This is desirable because if the blend for the A-1 layer contained only the single butene-containing component which imparts the low SIT, then the overall film would be difficult to process.

The composition of the A-1 layer provides an especially low SIT and high sealing strength due to the high C4 content in this layer. The PBC is selected to modify the Tm of the blend that is measured indirectly by seal initiation temperature and sealing force. Butene-containing components PBC-1 and PBC-2 must be blended with other polymers to improve its processability. There is a ratio of PBC in the A-1 seal interlayer to PBC in the A-2 skin layer which is preferably between about 5 and about 15.

The A-2 skin layer comprises from about 6 to about 12 wt % propylene-butene copolymer designated here as PBC-1. This is a high C4 content copolymer that helps to reduce the SIT and when used in low ratios such as no more than 12 wt % permits incorporating a higher proportion of matte resin into the A-2 layer material to ensure the low gloss in the surface together with high haze. The inventors have discovered that using significantly more than about 12 wt % PBC in this skin layer A-2 in this overall combination unacceptably increases gloss. In one preferred embodiment, PBC-1—i.e., the propylene-butene co-polymer in the skin layer having a relatively higher butene content and relatively lower melting point than the PBC-2- and PBC-3 copolymers in the seal interlayer A-1—is a metallocene alpha-olefin PP-based elastomer containing a high percentage (20 to 32 wt %) of butene. In one preferred aspect, the skin layer is devoid of the propylene-butene copolymer contained in the seal interlayer. That is, to the extent the skin layer contains a propylene-butene copolymer, it is a copolymer having a different composition than any copolymer in the underlying seal interlayer. For example, in one embodiment the skin layer contains propylene/butene copolymer of 20-32 wt. % butene by metallocene catalyst, melting temperature 75° C.; and the seal interlayer contains a propylene/butene copolymer of about 16-28 wt. % butene by metallocene catalyst having a melting point of 83° C. and a second polypropylene/butene copolymer having a lower butene % (i.e., containing butene in a wt % of no more than 16 wt %, such as between about 5 and about 15 wt %) and melting point of 135° C. (employing non-metallocene catalyst). Polypropylene/butene copolymers suitable for use in this invention are available, for example, under the brand names Mitsui Tafmer and Sumitomo.

The skin layer A-2 also contains from about 77 to about 88 wt % of matte resin which is a blend of polypropylene (PP) and polyethylene (PE).

The skin layer A-2 also optionally contains an antiblock additive in a proportion of from about 2000 to about 4500 ppm. In a preferred embodiment, this is pre-dispersed in the PBC-1 copolymer, or another type of PP copolymer as carrier. So the A-2 skin layer comprises the three components of a) the matte resin of blended PP and PE, b) the PBC-1 co-polymer, and c) the antiblock predispersed in a PBC or other PP copolymer.

An antiblock additive is a plastics modifier that is generally added to prevent blocking, which occurs when two adjacent layers of film adhere together when pressed together, such as during windup on a roll or film stacking. Antiblock additives are added to form micro-bumps on the surface of a plastic film, which minimizes film to film or film to metal or film to packed product contact. Antiblock additives may be inorganic materials, such as natural silica particles, talc, synthetic silica, calcium carbonate, ceramic spheres, kaolin/clay, and mica. Organic antiblock additives (also known as slip agents) include ethylene bisstearamide, stearyl erucamide, stearamide, erucamide, glycerol monostearate, zinc stearate, silicone, and PTFE (Teflon®). In certain preferred embodiments, the antiblock component is silica, kaolin, talc, PMMA, or mixtures of one or more of these. The antiblock additive preferably has a particle size between about 4 and about 8 μm.

Skin layer A-2 may optionally comprise a fluoroelastomer in an amount such as from about 0.1 to about 0.5 wt %.

Layer C-1 is a polymer-based layer which comprises at least about 50 wt % polymer, such as at least about 90 wt % and up to 100 wt % of a polymer. In one embodiment, layer C-1 has from about 90 to about 100 wt % of a homopolymer. A preferred embodiment is a layer consisting essentially of a polypropylene homopolymer or polypropylene and ethylene copolymer or polypropylene/ethylene/butene terpolymers having a MFI between 2 and 7 g/10 minutes, preferably 3 to 6 g/10 min.

Layer C-2 is a polymer-based layer which comprises at least about 50 wt % polymer, such as at least about 90 wt % and up to 100 wt % of a polymer. In one embodiment, layer C-2 has from about 90 to about 100 wt % of a polypropylene homopolymer or polypropylene and ethylene copolymer or polypropylene/ethylene/butene terpolymers having a MFI between 2 and 7 g/10 minutes, preferable 3 to 6 g/10 min. Layer C-2 also comprises an antiblock additive, such as from about 750 to 1250 ppm of an antiblock additive. One such preferred embodiment consists essentially of these two components. The antiblock additive can be any of those described above for the skin layer A-1; and in certain preferred embodiments, the antiblock component is silica, kaolin, talc, PMMA, or mixtures of one or more of these. The preferred antiblock has a particle size of about 2 to 4 μm. In embodiments where there is no layer C-1, layer C has this same composition as described for layer C-2.

Skin layer A-2 has a thickness in the range of about 1.5 to about 4 μm. Seal interlayer A-1 has a thickness in the range of about 1 to about 3 μm. Core layer B has a thickness in the range of about 8 to about 16 μm. Layer C-1 has a thickness in the range of about 0.5 to about 1.0 μm. Layer C-2 (or C) has a thickness in the range of about 0.7 to about 1.3 μm.

The overall thickness in certain embodiments is between about 12 μm and about 35 μm, such as between about 12 and about 24 µm, such as between about 16 µm and about 20 µm, between about 25 µm and about 35 µm, or between about 28 µm and about 32 µm.

As noted above, an object of the invention is to create a film having a relatively very low sealing initiation temperature (SIT) while maintaining high haze and low gloss. A lower SIT is desirable because it improves the production speed and also is compatible with the end user's changing its total structure from fin seal to lap seal. According to such process conditions a very low SIT matte film is required, with excellent sealing strength, low gloss and high haze. Good haze and low gloss are desirable because the packaged is intended to look like paper so no light reflection is necessary. The film of the invention preferably has an SIT of below about 87° C., such as below about 85° C. in some preferred embodiments, as determined by a standard method where SIT is measured at 200 g/in of sealing force, measured using a Instron lab equipment, with probes sealed at 0.5 secs dwell time and 22 psi of pressure (with a Brugger sealer). In one preferred embodiment, the SIT is between about 80 and about 87° C., such as between 82 and 85° C. as measured by these methods. The film of the invention has a haze of above about 65%, preferably above about 75%, as determined by ASTM D 1003-07. The film of the invention has a gloss of below about 14%, preferably below about 12%, as determined by ASTM D 2457-08.

The film of the invention has a tensile strength MD (machine direction) of at least about 1000 kg/sq·cm and no more than about 2000 kg/sq·cm, such as between about 1200 kg/sq·cm and about 1800 kg/sq·cm, as determined by ASTM D 882-02. The film of the invention has a tensile strength TD are coextruded as is well understood in the industry and the coextruded laminate sheet is cooled on a drum whose surface temperature is controlled to, for example, between 20° C. and 60° C. to solidify the laminate sheet. The laminate sheet is stretched in the longitudinal direction at about 135° C. to 165° C. at a stretching ratio of, for example, about 4 to about 6 times the original length. The stretched sheet is cooled to about 70° C. to 120° C. to obtain a uniaxially oriented sheet. The uniaxially oriented sheet is introduced into a tenter and heated to between 130° C. and 180° C. It is stretched in the transverse direction at a stretching ratio of, for example, about 7 to about 12 times the original length. The sheet is then heat-set or annealed to reduce internal stresses, minimize shrinkage, and yield a thermally stable biaxially oriented sheet.

In the final step of the BOPP production the film is passed through several rollers to ensure the film is wound flat without wrinkles. During the pass of the film through these rollers the film is exposed either to electric discharges, known as corona treatment or direct heat by gas combustion, known as flame treatment, to increase the surface energy, ensuring a proper wet out and bond of inks and adhesives.

EXAMPLES

Two multilayer (five-layer) sheets designated EX. 5 and EX. 6 were prepared according to the invention and compared to various three-layer experiments: Ex. 1, Ex. 2, Ex. 3, Ex. 4.

|  | Ex. 5 | Ex. 6 | Control | Ex. 1 | Ex. 2 | Ex. 3 | Ex 4 |
|---|---|---|---|---|---|---|---|
| No. of layers | 5 | 5 | 3 | 3 | 3 | 3 | 3 |
| Thickness (µm) | A2 = 1.8<br>A1 = 2 | A2 = 1.8<br>A1—2 |  | A = 2.2 | A = 2.2 | A = 2.2 | A = 3 |
| C3/C2 Compound (Matte resin) | A2—89%<br>A1—10% | A2—89%<br>A1—10% | A—100% | A—95% | A—85% | A—80% | A—65% |
| C3/C4 Elastomer PBC-1 | A2—10% | A2—10% |  | A—5% | A—15% | A—20% |  |
| C3/C4 Elastomer |  |  |  |  |  |  | A—35% |
| PBC-2 | A1—67.5% | A1—67.5% |  |  |  |  |  |
| C3/C4 Elastomer PBC-3 | A1—22.5% | A1—22.5% |  |  |  |  |  |
| Antiblock (ppm) |  | A2—3500<br>A1—2000 |  |  |  |  |  |
| Fluoropolymer | A2—1% | A2—1% |  |  |  |  |  |
| Gloss (%) | 12 | 13 | 8.8 | 11 | 11.5 | 13 | 15 |
| Haze (%) | 68 | 64 | 74 | 70 | 67.7 | 71 | 59 |
| SIT (° C.) | 86 | 86 | 110 | 105 | 110 | 93 | 82 |

(transverse direction) of at least about 1700 kg/sq·cm and no more than about 3000 kg/sq·cm, such as between about 1900 kg/sq·cm and about 2800 kg/sq·cm, as determined by ASTM D 882-02. The film of the invention has an elongation at break MD (machine direction) of at least about 90% and no more than about 250%, such as between about 100 and about 220%, as determined by ASTM D 882-02. The film of the invention has an elongation at break TD (transverse direction) of at least about 30% and no more than about 150%, such as between about 60% and about 110%, as determined by ASTM D 882-02.

The method of making the film is not narrowly critical. To form the film, the three or four or five, or more multilayers The five-layer films of the invention (experiments 1 and 2) demonstrated improved performance in terms of optical properties, sealing properties, and performance in comparison to the three-layer films.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A heat-sealable polymer-based multilayer film comprising:
   a polymer-based core layer;
   a seal interlayer applied to a first side of the core layer, wherein the seal interlayer consists of a matte resin, two distinct seal-layer propylene-butene copolymers, and optionally antiblock agents;
   a skin layer applied over the seal interlayer with the seal interlayer being between the skin layer and the core layer, wherein the skin layer comprises a skin-layer propylene-butene copolymer comprising 20 to 32 wt % butene, wherein the skin layer is formed from a blend comprising polypropylene, polyethylene, and up to 12 wt % of the skin-layer propylene-butene copolymer; and
   one or more polymer-based layers applied to a second side of the core layer opposite the first side;
   wherein:
   the multilayer film is biaxially oriented and has a seal initiation temperature of below 87° C.;
   the film has a haze of above 65% as determined by ASTM D 1003-07;
   the two distinct seal-layer propylene-butene copolymers comprise a first propylene-butene copolymer and a second propylene-butene copolymer and the first propylene-butene copolymer has a butene content which is at least 10 wt % greater than a butene content of the second propylene-butene copolymer;
   the matte resin of the seal interlayer comprises a blend of polypropylene and polyethylene; and
   a ratio of propylene-butene copolymer in the seal interlayer to propylene-butene copolymer in the skin layer is between about 5 and about 15.

2. The heat-sealable polymer-based multilayer film of claim 1 wherein the skin layer contains the skin-layer propylene-butene copolymer in a concentration between 6 and 12 wt %.

3. The heat-sealable polymer-based multilayer film of claim 1 wherein the skin-layer propylene-butene copolymer has a composition different from the seal-layer propylene-butene copolymers and the skin layer is devoid of the seal-layer propylene-butene copolymers.

4. The heat-sealable polymer-based multilayer film of claim 1 wherein the skin layer is formed from a blend consisting essentially of said polypropylene, said polyethylene, antiblock additive, and said up to 12 wt % of the skin-layer propylene-butene copolymer.

5. The heat-sealable polymer-based multilayer film of claim 1 wherein the matte resin of the seal interlayer comprises between 40 and 60 wt % polypropylene and between 40 and 60 wt % polyethylene.

6. The heat-sealable polymer-based multilayer film of claim 1 wherein:
   the first propylene-butene copolymer has a butene content which is between 20 and 40 wt % greater than a butene content of the second propylene-butene copolymer.

7. The heat-sealable polymer-based multilayer film of claim 5 wherein:
   the first propylene-butene copolymer has a butene content which is between 20 and 40 wt % greater than a butene content of the second propylene-butene copolymer.

8. The heat-sealable polymer-based multilayer film of claim 1 wherein:
   the matte resin constitutes between 17 and 25 wt % of the seal interlayer, the first propylene-butene copolymer constitutes between 20 and 30 wt % of the seal interlayer, and the second propylene-butene copolymer constitutes between 40 and 60 wt % of the seal interlayer.

9. The heat-sealable polymer-based multilayer film of claim 5 wherein:
   the matte resin constitutes between 17 and 25 wt % of the seal interlayer, the first propylene-butene copolymer constitutes between 20 and 30 wt % of the seal interlayer, and the second propylene-butene copolymer constitutes between 40 and 60 wt % of the seal interlayer.

10. The heat-sealable polymer-based multilayer film of claim 4 wherein the skin layer contains the skin-layer propylene-butene copolymer in a concentration between 6 and 12 wt %.

11. The heat-sealable polymer-based multilayer film of claim 1 wherein:
    the core layer comprises from 90 to 100 wt % of a homopolymer of polypropylene.

12. The heat-sealable polymer-based multilayer film of claim 1 wherein:
    the one or more polymer-based layers applied to the second side of the core layer opposite the first side consist of a single layer having a thickness in the range of about 0.7 to about 1.3 µm.

13. The heat-sealable polymer-based multilayer film of claim 1 wherein:
    the one or more polymer-based layers applied to the second side of the core layer opposite the first side consist of a first layer having a thickness in the range of about 0.5 to about 1.0 µm and a second layer having a thickness in the range of about 0.7 to about 1.3 µm.

14. The heat-sealable polymer-based multilayer film of claim 1 wherein:
    the seal interlayer has a thickness between about 1 and about 3 µm and comprises a matte resin which comprises a blend of polypropylene and polyethylene, and two distinct seal-layer propylene-butene copolymers comprising a first propylene-butene copolymer and a second propylene-butene copolymer wherein the first propylene-butene copolymer has a butene content which is between about 16 and about 28 wt % butene and the second propylene-butene copolymer has a butene content of less than about 16 wt %;
    the skin layer has a thickness in the range of about 1.5 to about 4 µm and contains the skin-layer propylene-butene copolymer in a concentration between 6 and 12 wt %, the skin layer propylene-butene copolymer contains between about 20 and about 32 wt % butene and has a composition different from the seal-layer propylene-butene copolymer and the skin layer is devoid of the propylene-butene copolymers of the seal layer; and
    the core layer has a thickness in the range of about 8 to about 16 µm and comprises from 90 to 100% of a homopolymer of polypropylene.

15. The heat-sealable polymer-based multilayer film of claim 1 wherein the skin layer consists of the polypropylene, the polyethylene, the skin-layer propylene-butene copolymer in a concentration of no more than 12 wt %, an optional antiblock additive, and an optional fluoroelastomer.

16. The heat-sealable polymer-based multilayer film of claim 1 wherein:
the skin layer contains between 6 and 12 wt % of the skin-layer propylene-butene copolymer, and the propylene-butene has butene (C4) content of from 20 to 30 wt. %.

17. The heat-sealable polymer-based multilayer film of claim 1 wherein the film has a haze of above 75% as determined by ASTM D 1003-07.

* * * * *